May 25, 1937.  J. C. FORD ET AL  2,081,533
APPARATUS FOR MAKING ARTICLES
Filed Aug. 17, 1933  5 Sheets-Sheet 1
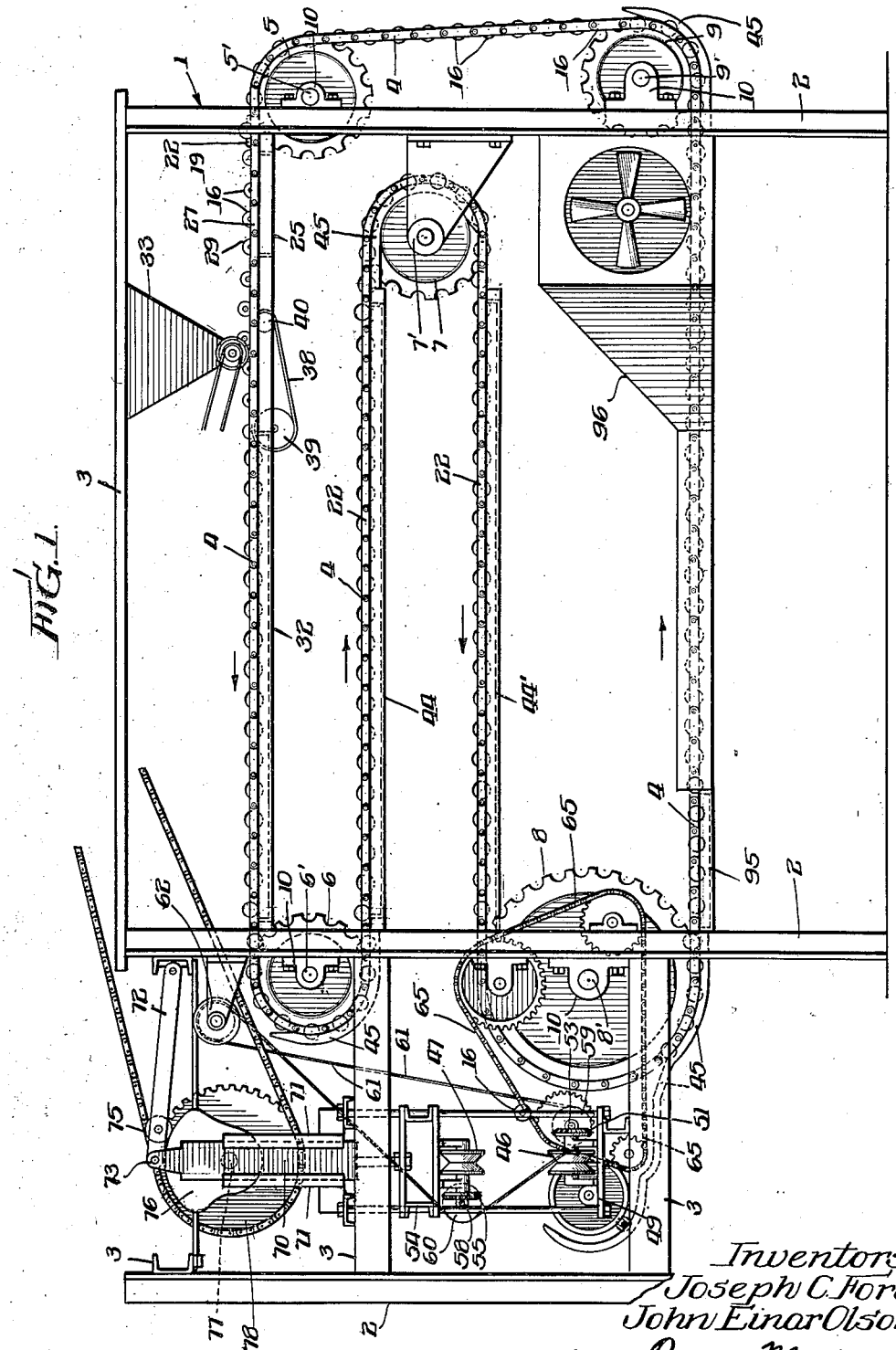
Inventors:
Joseph C. Ford
John Einar Olson
By: Cox & Moore attys

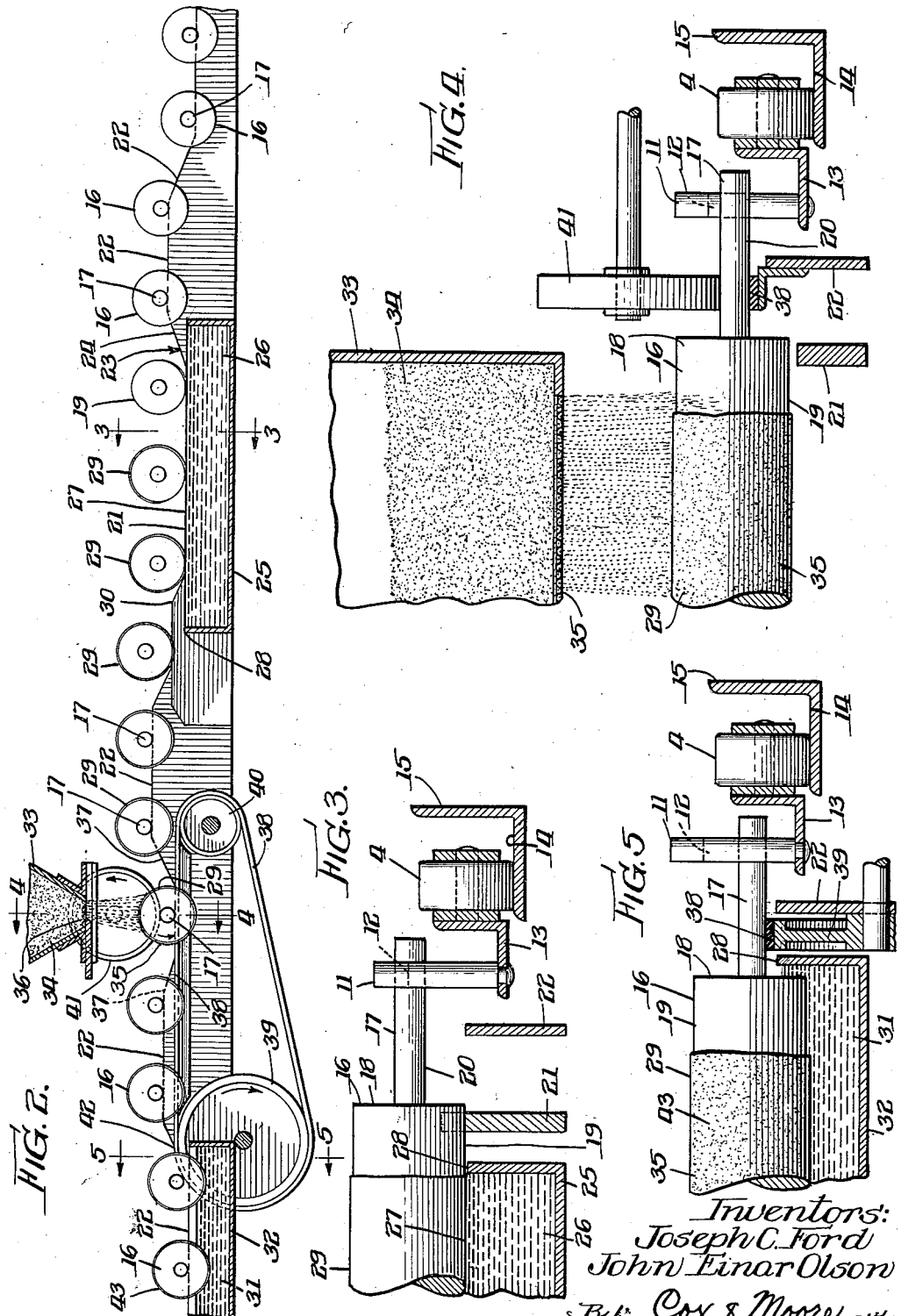

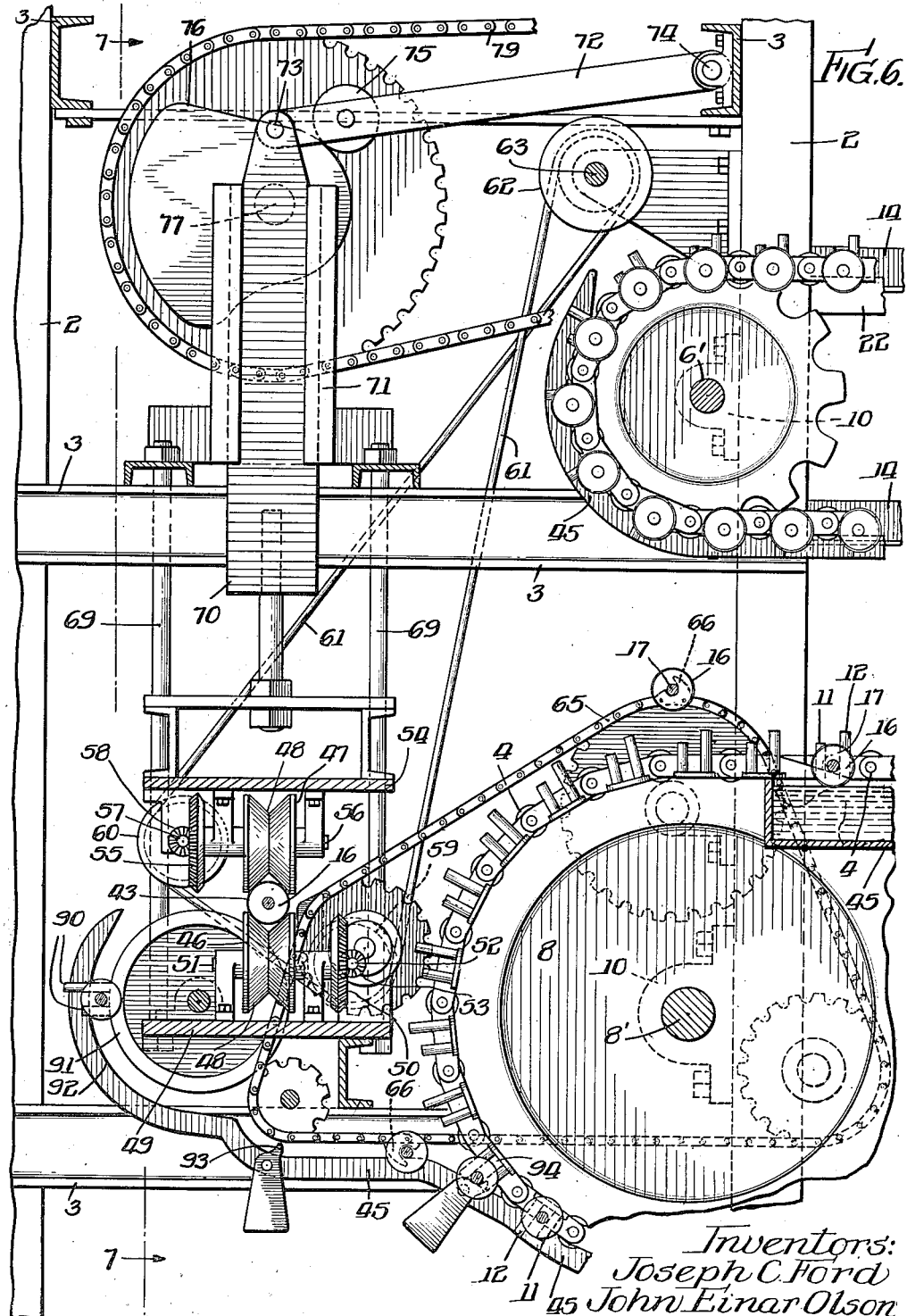

May 25, 1937.　　　　J. C. FORD ET AL　　　　2,081,533
APPARATUS FOR MAKING ARTICLES
Filed Aug. 17, 1933　　　5 Sheets-Sheet 4

Inventors:
Joseph C. Ford
John Einar Olson
By: Cox & Moore
attys.

May 25, 1937.  J. C. FORD ET AL  2,081,533
APPARATUS FOR MAKING ARTICLES
Filed Aug. 17, 1933  5 Sheets-Sheet 5
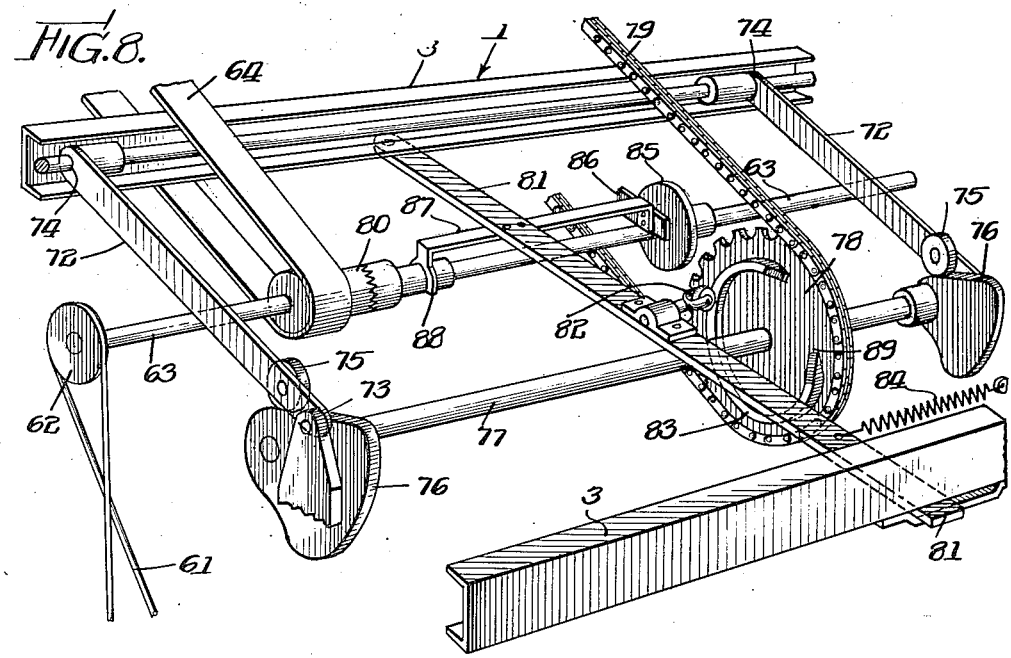
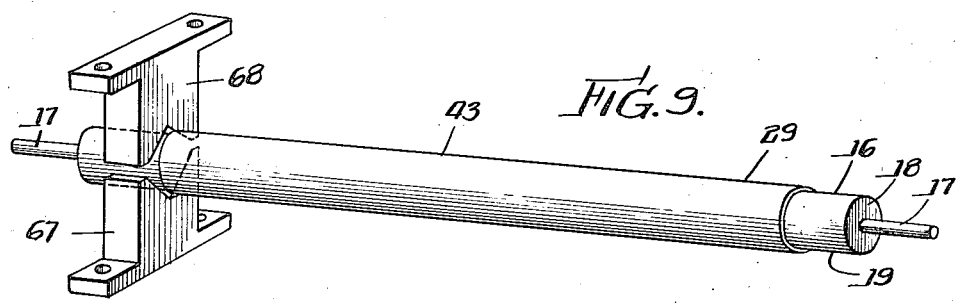
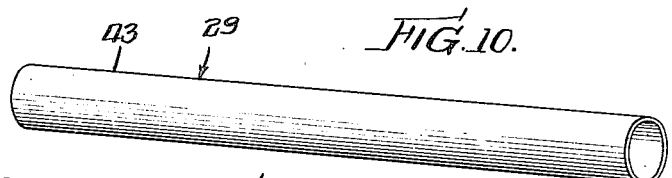
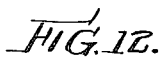
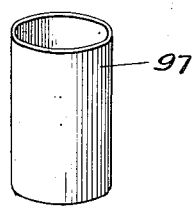
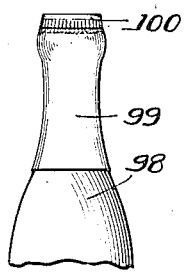
Inventors:-
Joseph C. Ford
John Einar Olson
By: Cox & Moore attys.

Patented May 25, 1937

2,081,533

UNITED STATES PATENT OFFICE 2,081,533

APPARATUS FOR MAKING ARTICLES

Joseph C. Ford and John Einar Olson, Madison, Wis., assignors to The Celon Company, Madison, Wis., a corporation of Wisconsin Application August 17, 1933, Serial No. 685,578

16 Claims. (Cl. 18—24)

This invention relates to an apparatus for making seals for containers, such as bottles, from a gelatinous substance such as viscose, jelly and the like.

The primary object of the invention is to provide new and improved apparatus for making container closures, such as sealing bands.

Another object of the invention is the provision of an apparatus which is provided with means for rotating and translating a plurality of roller molds, which is provided with means for coating molds with the substance by rolling the molds thereover, which is provided with means for selectively coating the molds, which regenerates the substance on the molds to make regenerated tubes, which has stripping means for stripping the regenerated tubes from the molds and which is provided with means for accelerating or decelerating the revolubility of the molds according to a predetermined arrangement.

A further object is to provide an improved apparatus composed of relatively few and simple parts timed and synchronized to perform certain steps in the manufacture of sealing bands continuously and uninterruptedly.

Numerous other objects and advantages will be apparent throughout the progress of the following specification.

The accompanying drawings illustrate a selected embodiment of the invention and the views therein are as follows:

Fig. 1 is a detail sectional view of the improved apparatus.

Fig. 2 is an enlarged detail sectional view of a part of the apparatus showing the manner in which the molds are operated through several steps of the manufacturing process.

Fig. 3 is a detail sectional view on the line 3—3 of Fig. 2.

Fig. 4 is a detail sectional view on the line 4—4 of Fig. 2.

Fig. 5 is a detail sectional view on the line 5—5 of Fig. 2.

Fig. 6 is a detail sectional view at the discharging end of the machine showing the stripping mechanism, the view being taken on the line 6—6 of Fig. 7.

Fig. 8 is a detail perspective view of some of the stripper mechanism.

Fig. 9 is a detail perspective view showing a filmed roller clamped in position prior to the stripping operation.

Fig. 10 is a detail perspective view of a regenerated tube immediately after the stripping operation.

Fig. 11 is a detail perspective view of a regenerated band in its hydrated state.

Fig. 12 is a detail perspective view showing the band applied to a bottle and in its dehydrated state.

Figure 7:
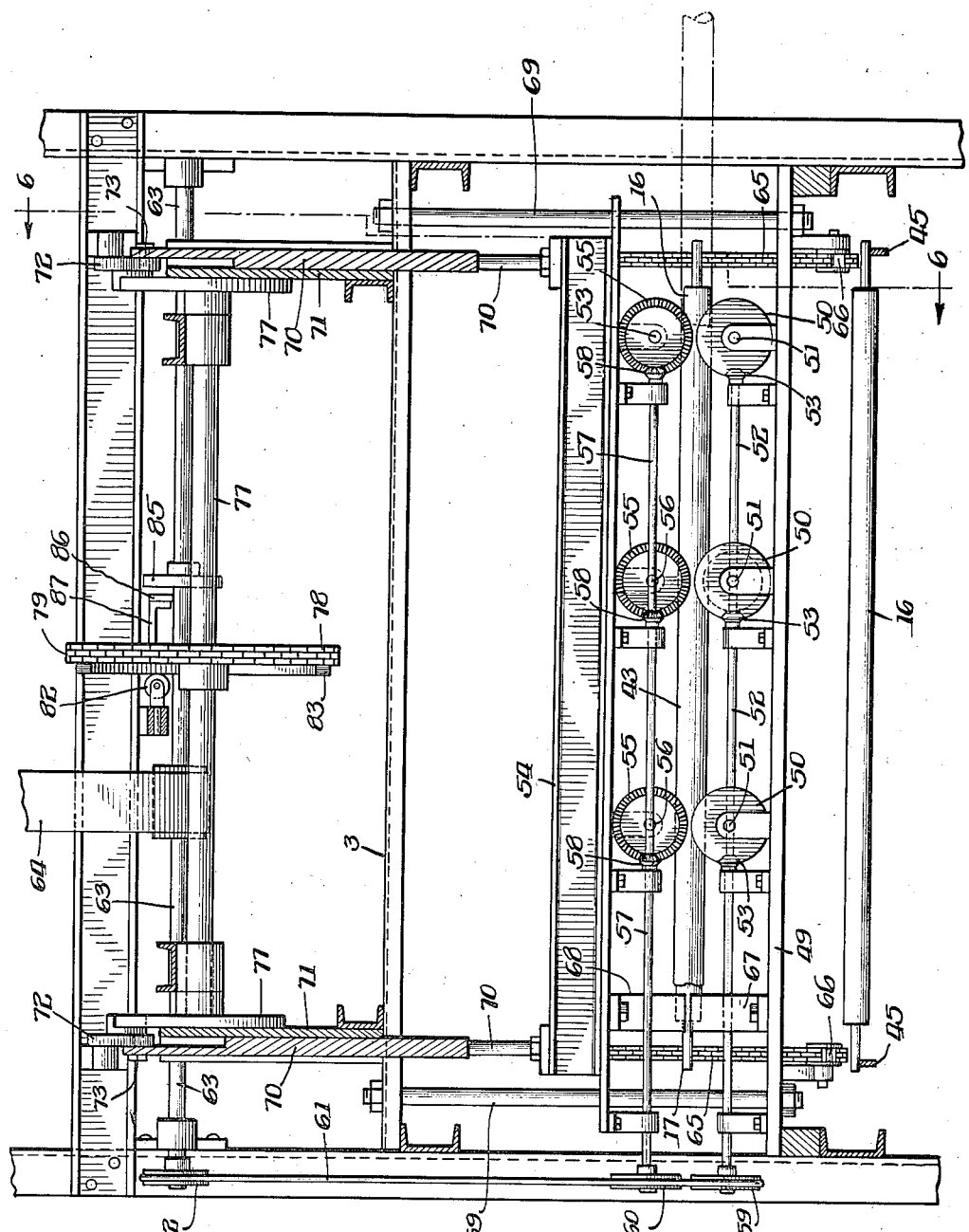
Fig. 7 is a detail end elevation partly in section on the line 7—7 of Fig. 6.

The improved apparatus embodying the invention and herein shown for the purpose of illustration comprises a frame 1 having a plurality of uprights 2 and members or braces 3. Spaced endless chains 4, Fig. 1, pass over sprockets 5, 6, 7, 8 and 9 which are mounted on horizontal transverse shafts 5', 6', 7', 8', and 9' respectively, the shafts being journaled in suitable bearings 10. Any one of the sprockets may be driven to move the chains continuously along a winding or circuitous path. The chains 4 are provided with spaced pins 11 and 12, Fig. 3, which are conveniently fixed to the chains in any desirable manner, such as by the member 13, Figs. 3-5. The chains may be supported on the guides 14 of members 15. A plurality of roller molds 16 having shafts 17 projecting from the ends 18 of the molds are arranged between the pins 11 and 12 and are translated by the chains. The rollers 16 are rotated during translation by the engagement of either the exterior surfaces 19 of the molds or the exterior surfaces 20 of the shafts 17 with the rails 21 and 22 respectively. The rollers or molds 16 are carried over the pulleys 5 and deposited on the rails 22 and are translated along the rails 22 and as their shafts 17 are in engagement with the rails 22, the molds or rollers 16 are given revoluble movement. The upper edges of these rails may be knurled to cause positive rolling action of the roller molds 16 when they are being translated by the chains across the rails. The rails 22 are cut away, as indicated at 23, to provide inclined surfaces 24 which allow the roller molds 16 to roll on their peripheral surfaces 19 on the rails 21 as they are translated over a container 25 containing substance 26. Due to the fact that the peripheral surfaces 19 of the rollers are greater than the peripheral surfaces 20 of the shafts 17, the rollers or molds 16, during translation by the chains 4, will rotate at a speed less than if they were rolling on their axes 17. The liquid level 27 of the substance 26 is at least even with the upper edge 28 of the container 25. Therefore, the rollers or molds 16 are in contact with the substance or viscose 26, and as the rollers pass across the substance 26 and in contacting relationship therewith, a film 29 of the substance will adhere to the exterior surfaces of the molds.

The rails 21 are raised as indicated at 30, Fig. 2, to raise the rollers 16 off their peripheral surfaces 19 and reposition the rollers with their axes 17 supported on the rails 22. The molds being so supported, therefore, rotate at a more rapid speed and cause the film to be equally distributed about the outer surfaces of the rollers as they pass to a coagulating bath 31 in the tank 32. If desired, the film 29 may be coated with a pigment immediately before the rollers reach the bath 31. If the film is to be coated with a pigment, it is desirable that the rollers be rotated at a relatively rapid speed as they pass the pigment hopper 33 to have pigment 34, such as mica, sprinkled or dusted thereon to provide a pigmentized coated surface 35, the hopper being agitated by means, not shown, to sift mica through the screen bottom 36. Additional rotary impetus may be given the rollers by cutting away the rails 22 as indicated at 37 and allowing the shafts 17 of the rollers to rest upon driven belts 38 on the pulleys 39 and 40, and by the engagement of a driven roller 41. The additional speed given the rollers insures the powdered pigment being equally distributed about the entire exterior surface of the film 29. The rollers or molds 16 are then translated to the bath 31 and as they reach the bath 31, they roll downwardly over the surfaces 42 of the belts 38 about the pulleys 39 which causes still greater rotary speed to be given the rollers and, therefore, causes practically instant coagulation of the film on the rollers to provide regenerated tubes 43.

The tubes are kept rolling in the bath in the tank 32 a predetermined length of time and then carried by the chains in a reverse direction and rotated in a solution in the tank 44 where the filmed tubes 43 are further coagulated. The rollers are again reversely translated through a regenerating solution in a tank 44' and the tubes are ready to be removed or stripped from the rollers. Where the chains pass over the pulleys, suitable guides 45 are provided to keep the roller molds 16 in proper position to be guided by the chains and translated along the rails. The solutions and the chemicals used therein for coagulating and regenerating the viscose into hydrated cellulose are well known and the properties thereof will not be described.

The means for stripping the tubes from the rollers comprises a plurality of lower and upper rollers 46 and 47 each having a V-shaped periphery 48. The rollers 46 are fixedly mounted on a base 49 and carry gears 50 mounted on their axles 51. A drive shaft 52 carries gears 53, Fig. 7, which mesh with the gears 50. The rollers 47 are carried by a vertically movable head 54 and have gears 55 mounted on their axles 56. A shaft 57 carries gears 58 which mesh with the gears 55. The shafts 52 and 57 carry pulleys 59 and 60 respectively which are driven by a flexible belt 61 from a pulley 62 mounted on the cross shaft 63. The cross shaft 63 is driven by a belt 64 having operable relationship with a driven member, not shown. The head 54 carrying the V-shaped rollers 47 is movable vertically toward and away from the lower rollers 46 and cooperates therewith for stripping the film from the roller molds.

Driven chains 65 carry spaced alined receiving lugs 66 and are arranged in juxtaposition relative to the chains 4 so that after the rollers 16 leave the final bath 45, the axes 17 of the molds 16 will be engaged by the fingers and carried by the chains 65 and deposited in the V-shaped peripheral grooves in the lower rollers 46 and in the V-shaped lower clamping jaw 67. After each roller 16 carrying the cellulose tubes 43 is deposited on the rollers 46 and the clamping member 67, the head 54 will move downwardly from the position shown in Fig. 1 into engagement with the mold as shown in Fig. 6, the film to be engaged between the rollers 46 and 47 and the roller to become impinged between the lower jaw 67 and the upper jaw 68 which is rigidly mounted on the head 54. The roller or mold 16 is thus prevented from being rotated and as the rollers 46 rotate in a direction opposite to the rollers 47, the film will be pulled or stripped from the mold. The head 54 moves vertically and is timed to drop into position when a filmed roller is deposited in position on the lower rollers, and the normally inoperative rollers 46 and 47 are periodically rotated, rotation of the rollers occurring intermittently in timed relationship with the head 54.

The head 54 is carried by guide rods 69 which have free slidable movement through the cross frame supporting members 3. Slide members 70 are fixed to the head 54 and operated through guideways or blocks 71. The upper ends of the members 70 are connected to bars 72 as indicated at 73, Fig. 8. The bars 72 are pivoted to a part of the frame as indicated at 74 and carry rollers 75 which engage cam members 76. The cam members 76 are fixed to a transverse shaft 77 which has fixed thereto a sprocket 78 driven by a chain 79. Thus, during rotation of the shaft 77, the cam members 76 will raise and lower the arms 72, and inasmuch as the members 70 are fixed to the arms 72, the head 54 will be periodically or intermittently raised and lowered.

As it is desirable that the rollers 46 and 47 rotate only when the tubes 43 are to be stripped, a clutch 80, Fig. 8, is interposed in the shaft 63. The clutch is operated by a pivoted lever 81 which carries a roller 82 engaging a cam 83 on the drive sprocket 78, a spring 84 being connected to the lever 81 to hold the wheel 82 against the cam 83. Therefore, upon rotation of the sprocket 78, the clutch 80 is engaged and disengaged causing rotation and non-rotation of the shaft 63, as desired. The shaft 63 also carries a friction wheel 85 against which a brake shoe 86 engages when the clutch is disengaged. The brake shoe 86 is carried by an arm 87 connected to the lever 81. This same arm 87 carries the means 88 for moving the clutch 80 into and out of engagement. During rotation of the sprocket 78, the cams 76 will cause the head 54 to be intermittently raised and lowered, and as the wheel 82 is in engagement with the cam 83, the lever 81 will be moved horizontally to engage and disengage the clutch 80. When the clutch 80 is in engagement, the lever will be toward the left, as shown in Fig. 8, and the brake shoe 86 will be out of frictional engagement with the wheel 85. When the cam roller 82 engages the low spot 89 of the cam, the spring 84 will pull the lever 81 to the right, disengage the clutch 80 and move the brake shoe 86 into engagement with the wheel 85. The lowering of the head 54 occurs when a roller mold 16 is deposited in the V-shaped grooves of the rollers 46 and the jaw 67, causing the upper rollers 47 to engage the tubes 43 and the upper jaw 68 to engage the lower molds 16. At this time the clutch 80 will be in engagement and cause rotation of the pulleys 62 which drives the belt 61 for rotating the rollers 46 and 47. The rotation of the rollers 46 and 47 causes the tubes 43 to be stripped from the molds.

After the tubes 43 have been stripped from the molds, the head 54 will return to upward normal position and the rollers 46 and 47 will cease rotating. The molds 16 are then free and will become engaged by the projecting fingers 90, Fig. 6, on rotary wheels 91 which are synchronously timed with respect to the other mechanism. The fingers 90 will engage the shafts 17 of each roller and deposit each roller in a guide 92 where the molds will roll against retarding stops 93 and become engaged by the lugs 66 on the chain 65. The lugs 66 move the molds from the pivoted retarding stops 93 and deposit them against the pivoted retarding stops 94 where they will again be engaged by the chains 4 and return to complete another cycle of operation.

After the molds have been removed from the retarding stops 94 and engaged by the chains 4, they will be carried by the chains 4 through the tanks 95 and washed. The molds are then carried through a drying chamber 96 after which time they are again carried by the chains 4 to the filming tank 25.

*Operation*

Roller molds 16 are carried by continuously operated chains 4 and pass over a tank 25 where they are filmed with substance 26. The rollers, after being filmed with the substance, may have a pigment sprayed thereon and then passed through successive coagulating and regenerating baths. After the film on the rollers is regenerated to provide cellulose tubes 43, the roller molds carrying the tubes are deposited on non-rotating rollers 46 and a clamping jaw 67. As soon as the mold is in position, the head 54 will move downwardly and cause the mold to be impinged between the lower jaw 67 and the upper jaw 68 and the film or tube 43 can be engaged by the rollers 46 and 47. As soon as this engagement occurs, the clutch 30 will operate and cause the rollers 46 and 47 to rotate in opposite directions and strip the tube 43 from each roller as they successively pass to stripping position. When the tube is stripped, the head 54 will return to upward normal position and rotation of the rollers 46 and 47 will cease. The fingers 90 on the wheel 91 will then remove the mold 16 from the lower rollers 46 and the lower jaw 67 and carry the stripped mold to a predetermined position where the lugs 67 will carry it to a position to be again engaged by the chains 4. The molds will then be washed by passing them through the tanks 95 and then dried by passing them through a drying chamber 96. The cycle of operation is then completed and the molds are ready to be refilmed.

The tubes 43 are then cut into proper lengths to provide hydrated bands 97, Fig. 11. The hydrated bands 97 are then slipped over the end of a container, such as a bottle 98, and permitted to become dehydrated. The band, when dehydrated in position on the container, provides a sealing element 99 to seal the neck of the bottle and the bottle closure cap 100.

The invention provides an apparatus for making hydrated cellulose bands for ornamenting and sealing containers. The apparatus provides for continuously moving rollers throughout certain steps of the operation to first film the rollers and then regenerate the film on the rollers to provide cellulose tubes. The regenerated tubes are stripped from the rollers and the rollers are washed and returned to feeding position. The apparatus has its various parts properly synchronized so that the manufacture of the articles may be continuous and uninterrupted. While the apparatus has been described for making cellulose bands or seals, it is, of course, understood that other articles may also be made, for instance, the substance 26 in the tank 25 may contain a gelatinous substance, such as gelatin, in which case the coagulating tanks 32, 44 and 45 are dispensed with and a temperature controlled compartment, not shown, is substituted.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. An apparatus for making sealing bands comprising a plurality of translating molds, a body of viscous substance, a holder therefor, means for rotatively passing the molds over the surface of the viscous substance to be coated with a film of the substance, while translating the molds across the surface in a straight line, and means for increasing the speed of rotation of the molds after they have contacted the substance.

2. An apparatus of the type described comprising constantly movable chains, molds translated by said chains, means for rotating the molds across the surface of the substance to be coated with the substance while being translated, means for regenerating the substance on the molds to form tubes, means for holding the molds stationary and stripping the tubes therefrom, means for removing the molds from the chains while being stripped, and means for moving the molds to position on the chains to be again translated.

3. An apparatus of the type described comprising constantly movable chains, molds translated by said chains, means for rotating the molds across the surface of the substance to be coated with the substance while being translated, means for regenerating the substance on the molds to form tubes, means for holding the molds stationary and stripping the tubes therefrom, means for removing the molds from the chains while being stripped, means for returning the molds to position on the chains after the molds are stripped, means for washing the molds on the chains, and means for drying the mold after being washed.

4. Stripping means comprising a plurality of circular members each having a gripping surface formed circumferentially thereon, means for receiving molds, said molds being partially coated with a film, clamping means movable toward said last-named means for clampingly engaging and holding the molds, means for rotating said circular members with their gripping surfaces against the film on the molds so as to translate the film along the molds and to strip said film therefrom.

5. Stripping means comprising a plurality of circular members each having a gripping surface formed circumferentially therearound, clamping means for receiving molds and clampingly engaging said molds, said molds being partially coated with a film, said clamping means engaging only one end of the molds at a point between the end of the molds and the beginning of the film thereon, means for moving some of the circular members downwardly to bring their gripping surfaces into contact with the film on the molds, means to move others of said circular members upwardly to bring their gripping surfaces into contact with the molds, means for rotating said circular members in correspondingly opposite directions to translate the film along the molds away from the clamped end so as to deliver the film off the free end of the molds.

6. In an apparatus of the character described, a stripping device comprising means for receiving molds, said molds being partially coated with a film, means for clamping said molds, said last named means engaging only one end of the molds at a point between the end thereof and the beginning of the film thereon, a plurality of circular means, each of said circular means having a V-shaped groove extending circumferentially around the rim thereof, means for moving said circular means so as to bring the grooves thereon into contact with the film on the molds at points on correspondingly opposite sides thereof, and means for rotating said circular means so that the film is urged away from the clamped end of the molds and off at the free end of the molds.

7. An apparatus for making open-ended regenerated cellulose cylinders comprising a plurality of cylindrical molds of predetermined length, means for moving the molds in a continuous predetermined path, said path including straight-line movement, and container means for holding a regenerable solution of cellulose, said container being positioned with respect to the predetermined path of the molds so that each mold passes over the container in a straight line and with the mold surface substantially flush with the top edge of the container.

8. An apparatus for making open-ended regenerated cellulose cylinders comprising a plurality of cylindrical molds of predetermined length, means for moving the molds in a continuous predetermined path, said path including straight-line movement, and container means for holding a regenerable solution of cellulose, said container being positioned with respect to the predetermined path of the molds so that each mold passes over the container in a straight line and with the mold surface substantially flush with the top edge of the container, said container furthermore being narrower in width than the length of the molds.

9. An apparatus for making open-ended regenerated cellulose cylinders comprising a plurality of cylindrical molds of predetermined length, means for moving the molds in a continuous predetermined path, said path including straight-line movement, container means for holding a regenerable solution of cellulose, said container being positioned with respect to the predetermined path of the molds so that each mold passes over the container in a straight line and with the mold surface substantially flush with the top edge of the container, said container furthermore being narrower in width than the length of the molds, container means for holding a regenerated bath, said container being wider than the length of the molds, and means associated therewith for causing the molds to dip down into a position of partial immersion in said bath.

10. An apparatus for making open-ended regenerated cellulose cylinders comprising a plurality of cylindrical molds of predetermined length, means for moving the molds in a continuous predetermined path, said path including straight-line movement, container means for holding a regenerable solution of cellulose, said container being positioned with respect to the predetermined path of the molds so that each mold passes over the container in a straight line and with the mold surface substantially flush with the top edge of the container, said container furthermore being narrower in width than the length of the molds, container means for holding a regenerated bath, said container being wider than the length of the molds, means associated therewith for causing the molds to dip down into a position of partial immersion in said bath, means for translating the molds horizontally through the last named container, and means for causing the molds to rotate during translation therethrough.

11. An apparatus for making container seals comprising a plurality of spaced molds, means for continuously translating the molds along a predetermined path, in at least one portion of which said molds travel in a substantially straight line, means for rotating said molds, and means for rotating the molds at different speeds at predetermined intervals while translating the molds in said substantially straight line.

12. An apparatus for making container seals comprising a plurality of spaced molds, means for continuously translating the molds along a predetermined path, in at least one portion of which said molds travel in a substantially straight line, means for rotating said molds, means for rotating the molds at different speeds at predetermined intervals while translating the molds in said substantially straight line, and means for preventing individual rotation of the molds when a mold moves to a predetermined position.

13. An apparatus for making container seals comprising a plurality of spaced molds, means for continuously translating the molds along a predetermined path, in at least one portion of which said molds travel in a substantially straight line, means for rotating said molds, means for rotating the molds at different speeds at predetermined intervals while translating the molds in said substantially straight line, and means for preventing translation and rotation of a mold when the mold reaches a predetermined position.

14. An apparatus for making container seals comprising a plurality of spaced molds, means for continuously translating the molds along a predetermined path, including a substantially straight line path, means for rotating said molds, means for rotating the molds at different speeds at predetermined intervals while translating the molds in the substantially straight line path, means for preventing translation and rotation of a mold when the mold reaches a predetermined position, and rotary means engaging the mold and rotating about an axis at an angle to the axis of the mold for stripping the mold.

15. An apparatus for making container seals comprising a plurality of spaced molds, means for continuously translating the molds along a predetermined path, including a substantially straight line path, means for rotating said molds, means for rotating the molds at different speeds at predetermined intervals while translating the molds in the substantially straight line path, means for preventing translation and rotation of a mold when the mold reaches a predetermined position, and means for moving the mold to position to be again translated.

16. An apparatus for making sealing bands and the like comprising a plurality of translating molds, means for conveying the molds in a predetermined path, a body of viscous substance adjacent the path and adapted to be hardened or coagulated by chemical or physical means, means to rotatively pass the molds over the surface of said substance to be coated with the film of the substance, regenerating means adjacent said path and adapted to contact said film, and means for stripping the tubes longitudinally of the molds.

JOSEPH C. FORD.
JOHN EINAR OLSON.